United States Patent
Allemand et al.

(10) Patent No.: US 8,956,478 B2
(45) Date of Patent: Feb. 17, 2015

(54) PROCESS FOR JOINING REFRACTORY CERAMIC PARTS BY SPARK PLASMA SINTERING (SPS)

(75) Inventors: Alexandre Allemand, Bordeaux (FR); Fabienne Audubert, Cadenet (FR)

(73) Assignee: Commissariat a l'Energie Atomique, Paris (FR)

( * ) Notice: Subject to any disclaimer, the term of this patent is extended or adjusted under 35 U.S.C. 154(b) by 226 days.

(21) Appl. No.: 12/442,913

(22) PCT Filed: Sep. 27, 2007

(86) PCT No.: PCT/EP2007/060258
§ 371 (c)(1),
(2), (4) Date: Feb. 25, 2010

(87) PCT Pub. No.: WO2008/037765
PCT Pub. Date: Apr. 3, 2008

(65) Prior Publication Data
US 2010/0139840 A1  Jun. 10, 2010

(30) Foreign Application Priority Data

Sep. 27, 2006 (FR) ..................... 06 53973

(51) Int. Cl.
*C03B 29/00* (2006.01)
*B29C 65/00* (2006.01)
*C04B 35/645* (2006.01)
(Continued)

(52) U.S. Cl.
CPC ........ *C04B 35/645* (2013.01); *C04B 2235/6562* (2013.01); *C04B 2235/666* (2013.01); *C04B 35/58014* (2013.01); *C04B 2235/6567* (2013.01); *C04B 2235/6565* (2013.01);
(Continued)

(58) Field of Classification Search
USPC ........ 156/89.11, 272.2; 219/78.01, 78.02, 83, 219/86.22
See application file for complete search history.

(56) References Cited

U.S. PATENT DOCUMENTS 3,241,956 A  3/1966  Inoue
3,250,892 A  5/1966  Inoue
(Continued)

FOREIGN PATENT DOCUMENTS

EP  1 162 022 A1  12/2001
FR  2707 196  1/1995
(Continued)

OTHER PUBLICATIONS

Miyasak et al., JP 2005-262244 machine translation, Published Sep. 29, 2005.*
(Continued)

*Primary Examiner* — Alex Efta
(74) *Attorney, Agent, or Firm* — Brinks Gilson & Lione

(57) ABSTRACT

A process for joining, by spark plasma sintering, at least two refractory ceramic parts, each of the parts having at least one surface to be joined by spark plasma sintering, in which surfaces to be joined are brought into contact without addition of any sort between the surfaces. Then, a joining pressure of 1 to 200 MPa is applied to the ceramic parts. A pulsed electric current having an intensity of 500 A to 8000 A is applied to the ceramic parts so as to raise the temperature of the parts to a joining temperature of at least 1300° C. Then, the electric current is terminated simultaneously with the pressure, and the parts are cooled, and the joined parts are recovered.

32 Claims, 4 Drawing Sheets

(51) Int. Cl.
  *C04B 35/58* (2006.01)
  *C04B 35/56* (2006.01)
  *C04B 35/575* (2006.01)
  *B23K 9/10* (2006.01)
  *B23K 11/00* (2006.01)
  *B23K 11/06* (2006.01)

(52) U.S. Cl.
  CPC .......... *C04B 35/5611* (2013.01); *C04B 35/575* (2013.01); *C04B 35/5622* (2013.01)
  USPC .................. 156/89.11; 156/272.2; 219/78.01; 219/83; 219/86.22

(56) References Cited

U.S. PATENT DOCUMENTS

| | | | |
|---|---|---|---|
| 5,794,113 A * | 8/1998 | Munir et al. | 419/45 |
| 6,001,304 A * | 12/1999 | Yoo et al. | 419/10 |
| 6,309,591 B1 * | 10/2001 | Yoo et al. | 266/249 |
| 6,384,365 B1 * | 5/2002 | Seth et al. | 219/76.13 |
| 6,515,250 B2 * | 2/2003 | Miyasaka et al. | 219/78.02 |
| 2005/0087291 A1 * | 4/2005 | Fujita et al. | 156/285 |
| 2007/0183921 A1 * | 8/2007 | Furuya et al. | 419/56 |
| 2007/0220743 A1 * | 9/2007 | Tsukamoto et al. | 29/831 |

FOREIGN PATENT DOCUMENTS

| | | | |
|---|---|---|---|
| FR | 2 728 561 | A1 | 6/1996 |
| FR | 2 748 471 | A1 | 11/1997 |
| FR | 2 749 787 | A1 | 12/1997 |
| JP | 2005-262244 | A | 9/2005 |
| JP | 2005262244 | A * | 9/2005 |

OTHER PUBLICATIONS

PCT International Search Report, dated Mar. 19, 2008.

* cited by examiner

PROCESS FOR JOINING REFRACTORY CERAMIC PARTS BY SPARK PLASMA SINTERING (SPS)

PRIORITY CLAIM

This application is a U.S. nationalization of PCT Application No. PCT/EP2007/060258, filed Sep. 27, 2007, and claims priority to French Patent Application No. 06 53973, filed Sep. 27, 2006 the entire contents of which are hereby incorporated herein by reference.

TECHNICAL FIELD

The invention relates to a process for joining refractory ceramic parts by spark plasma sintering (SPS).

The technical field of the invention may be generally defined as that of joining ceramics, more precisely refractory ceramics.

The expression "refractory ceramics" is generally understood to mean ceramics that have sintering temperatures above 1300° C.

BACKGROUND

Due to their refractory and brittle nature, ceramics are materials that are difficult to form.

The current processing means are relatively long and expensive, when highly refractory ceramics such as carbides or nitrides have to be sintered.

It is generally difficult to manufacture parts of complex shape with ceramics, and in particular refractory ceramics.

It is therefore often preferable to manufacture structures from ceramic elements or parts of simple shape, then to join these elements to produce the final structure, of more complex shape.

Due to the high temperatures, for example in the vicinity of 1000° C. and above, used in the applications of ceramics such as silicon carbide, the joining of these ceramics by bonding with organic products is excluded.

Moreover, the conventional techniques of joining by welding using a beam of energy with or without solder (TIG, electron or laser welding) and involving a partial melting of the parts to be joined cannot be used for joining ceramics.

This is because during local heating the thermal shock will lead to a sudden rupture of the ceramic before a possible start of melting.

Consequently, solid phase diffusion welding, sinter-joining, and reactive brazing are currently the most common techniques for producing refractory ceramic joints.

Solid phase diffusion welding and also sinter-joining have the disadvantage of being restrictive from the point of view of their implementation.

For solid phase diffusion welding, the shape of the parts must remain simple if uniaxial pressing is used, or else require complex tooling and preparation comprising, for example, manufacture of an envelope, leaktight sealing under vacuum, hot isostatic pressing and final machining of the envelope, if HIP (hot isostatic pressing) is used.

In the case of sinter-joining, the same problems remain (shape of the parts, complexity of implementation) with, in addition, the need to control the sintering of a solder powder to be inserted between the two materials to be joined.

These two techniques also require the use of holds, plateaus of long duration (one to several hours) at high temperature since the procedures used involve solid state diffusion; these long durations could favour the enlargement of the grains of refractory alloys and embrittle them.

Reactive brazing is an inexpensive, easy-to-use technique that is currently the most commonly used. Parts of complex shape can be produced by carrying out capillary brazing and the operations are limited to placing the solder between or in the vicinity of the joint and melting the braze.

Thus, at the present time, the best known process for joining refractory ceramics such as SiC is the process known as the "BRASIC" process of the Commissariat à l'Energie Atomique [Atomic Energy Commission].

This process, described in particular in French patent application nos. FR-A-2 749 787, FR-A-2 748 471, FR-A-2 728 561, and FR-A-2 707 196, makes it possible to join refractory ceramic parts, for example parts made of silicon carbide, by refractory brazing.

The parts to be joined are brought into contact with an intermetallic braze and the assembly formed by the parts and the braze is heated at a brazing temperature equal to the melting point of the braze in order to form a refractory joint. This process, which has been developed on an industrial scale, however has certain limitations:

i) the operating temperature of the brazed assembly must not exceed the melting point of the braze;
  ii) the braze corresponds to a second phase that may, in some cases, prove unacceptable for the use of the material, and may, for example, cause the neutronic incompatibility of the braze;
  iii) the nature of the braze is intrinsically linked to the nature of the material to be brazed, that is to say for each ceramic to be assembled it is necessary to develop a new type of specific braze, which may result in a long and costly development period.

Furthermore, Spark Plasma Sintering (SPS) technology is known. The first patent applications relating to this technology were filed by K. INOUE at the end of the 1960s. These patent application matured into U.S. Pat. Nos. 3,241,956 and 3,250,892.

But it was necessary to wait until the end of the 1990s for the SPS technique to enjoy an experimental boom.

SPS is a sintering technique that consists in simultaneously applying to the bulk sample or pulverulent sample to be densified, or to the parts to be joined, a uniaxial pressure and current pulses of high intensity.

The powders or parts may be made of metal, ceramics or polymers.

The rise in temperature is applied to the sample via an assembly of plates and pistons made of graphite, the powder is inserted inside a graphite pelleting press. The assembly consisting of the pelleting press, the pistons and the plates is the sole assembly in the vacuum chamber to rise in temperature.

More precisely, the operating principle of an SPS machine and its main components is represented in FIG. 1. The powder (1) is placed in a graphite sleeve (2), between two pistons (3). A pressure (4) is applied to these pistons (3), and a direct current (5) is applied to electrodes (6). The powder (1), the pistons (3), the graphite sleeve (2) and a portion of the electrodes (6) are placed inside a vacuum chamber (7). Instead of the powder, it is possible to place two ceramic parts to be joined between the two pistons so as to have in the die the succession: piston-1st ceramic-2nd ceramic-piston.

The temperature is monitored via an optical pyrometer that also controls the electric power injected into the assembly. The currents used during the sintering may range up to 8000 A.

The main advantage of the SPS technology is the possibility of densifying the samples in relatively short time periods of the order of a few minutes, for example 5 to 10 minutes.

The sintering rapidity often makes it possible to minimize the grain growth and to attain, for certain materials, a density close to 100%.

However, spark plasma sintering (SPS) has been applied little or not at all to refractory ceramics and has not been applied to the joining of two refractory ceramic parts.

U.S. Pat. No. 6,515,250 relates to a process and a device for joining parts in which, in a first step, the surfaces of the parts to be assembled are brought into contact without using a graphite die. Then a pulsed current or a combination of a pulsed current and a direct current is applied to said surfaces while applying a pressure to the parts so as to temporarily join or connect the parts ("Step 1").

Next, a heat treatment is carried out on the temporarily joined parts in order to make this joining permanent and to obtain a joint strength equivalent to the strength of the material of each of the joined parts.

It is specified that the process of this patent makes it possible to join metal parts together and also a metal part to a non-metal part or non-metal parts together.

In the examples from this document, the joining of bars made of identical materials, for example made of stainless steel (SUS 304), or made of alloy tool steel (SKD 61) is carried out.

It is moreover indicated that the joining may be carried out between metal parts made of different materials, for example, between a part made of SKD 61 and a part made of aluminium alloy, between a part made of SUS 304 and a part made of SUS 420J2, between a part made of copper alloy and a part made of SUS 420J2, and between a part made of SKH 51 (high speed tool steel) and a part made of SKD 61, and also between a part made of metal and a non-metal part, or between non-metal parts, without using welding materials or brazing metals.

It is also specified that when this process is used for joining parts made of different materials, for example metal, and ceramic or plastic, a part that has gradient characteristics, that is to say that has a gradual variation of its properties from one side of the part to the other, is placed between the parts to be joined.

Finally, it is mentioned that the process of this patent may be applied to "various types of joining", for example the joining of an ultra-hard metal and a normal metal, or the joining of a part made of aluminium and a corrosion-resistant and wear-resistant part.

In conclusion, this patent neither describes nor suggests the joining together of two parts made of ceramics, and even less of two parts made of refractory ceramics, and does not mention the particular problems posed by the joining of two ceramics, in particular of two refractory ceramics.

Furthermore, the joining (step 1) is carried out without a graphite die. However, since ceramics are not good electrical conductors, it is impossible for the pulses of current to pass through the ceramics to be joined. This first step can therefore only function for metals or more generally current-conducting materials.

Moreover, the joining by pulsed current that is similar to SPS only constitutes an intermediate step leading to a temporary joining, the heat treatment following this step is absolutely necessary for ensuring the good cohesion of the interface.

In fact, it may be considered that in the process of this document the first step only constitutes a simple positioning of the parts and that no true joining is obtained.

U.S. Pat. No. 6,384,365 describes a process of consolidating or repairing turbine component parts, such as turbine blades by the spark plasma sintering (SPS) technique.

The blade may be made of a conventional cobalt superalloy or of a single crystal nickel-based superalloy.

If the blades are covered with a base coat made of, for example, MCrAlY, and/or with an outer thermal barrier ceramic coating such as a stabilized zirconia coating, this coating should be completely removed. It is specified that when the opposing surfaces to be joined of the turbine part are made of a ceramic material, a ceramic powder is then placed between these opposing surfaces. No exemplary embodiment is given, in particular concerning the joining of two parts made of ceramic, in particular made of refractory ceramic.

The SPS treatment time is less than 5 minutes at a temperature below 1500° C.

In conclusion, in this patent, in order to join ceramics it is obligatory to use a third interlayer phase as in the brazing processes described above.

Moreover, this patent does not describe or mention the joining of refractory ceramics, because the temperature of 1300° C. is insufficient for joining refractory ceramics, for example of carbide or nitride type.

In view of the aforegoing there is therefore a need for a process for joining ceramic parts by spark plasma sintering (SPS) that makes it possible to join refractory ceramic parts, namely having a sintering temperature above 1900° C.

There is also a need for such a process that allows the joining of these parts in a simple, reliable, rapid, inexpensive manner and that makes it possible to obtain a bond or joint of great cohesion and great strength.

SUMMARY

The goal of the invention is to provide a process for joining ceramic parts by spark plasma sintering (SPS) that meets, inter alia, this need and that does not have the drawbacks, defects, limitations and disadvantages of the prior art processes and that solves the problems of the prior art processes.

This goal, and others too, are achieved according to the invention by a process for joining, by spark plasma sintering, at least two refractory ceramic parts, each of the parts having at least one surface to be joined, in which the following successive steps are carried out:

- the surfaces to be joined of the parts are brought into contact without addition of any sort between said surfaces; then
- a pressure, known as the joining pressure, of 1 to 200 MPa (or 2000 bar) is applied to said parts;
- a pulsed electric current having an intensity of 500 to 8000 A is applied to said parts so as to raise the temperature of the parts to a temperature, known as the joining temperature, of at least 1300° C.; then
- the electric current ceases to be applied, simultaneously the pressure ceases to be applied, and the parts are cooled; and
- the joined parts are recovered.

The process according to the invention is fundamentally distinguished from the prior art processes for joining ceramic parts.

The process according to the invention comprises a limited number of simple, easy-to-use steps.

Owing to the process of the invention, a final, permanent joint, or cohesive bond, of great strength is obtained in a single operation by an SPS process, without the need to use a supplementary heat treatment step to obtain the final, permanent, solid, strong cohesive joint.

The process according to the invention therefore makes it possible to produce significant time and energy savings.

The process of the invention does not require the addition of material of any sort, for example powder, at the interface of the parts to be joined. Thus the presence of a second or third phase at the interphase, with all the problems that result therefrom, is avoided.

It has been demonstrated according to the invention that the selection of specific ranges of certain operating parameters of the SPS process surprisingly made it possible to join refractory ceramics, that is to say ceramics having sintering temperatures above 1300° C., for the first time in a cohesive and strong manner using only an SPS process, in a single step, without any consecutive treatment, in particular heat treatment, and without addition, insert, at the interface.

Thus, the pressure applied is, according to the invention, generally from 1 to 200 MPa and the intensity applied is generally from 500 to 8000 A. Therefore, a two-fold selection is made relating, on the one hand, to the pressure range and, on the other hand, to the intensity range.

There is no mention nor any suggestion in the prior art that this two-fold selection could enable a solid, strong, joining, without supplementary treatment, of specifically refractory ceramics, in particular since the joining of refractory ceramic parts is not explicitly described in the prior art and since the problems inherent to the joining of these ceramics are not touched on.

Preferably, the pressure is 10 to 150 MPa, more preferably 20 to 100 MPa, better 50 to 75 MPa.

Preferably, the intensity is 500 to 6000 A, more preferably 1000 to 3000 A.

The pressure and intensity values are chosen within the specific ranges above so that the temperature of the parts to be joined is raised above 1300° C., preferably to 1400 to 2000° C., more preferably to 1600 to 1950° C., for example to 1750° C.

The time during which said temperature, for example 1750° C., is maintained (also called the hold, plateau, or joining temperature), a time that may also be referred to as the hold time, is generally from 0 to 10 minutes, preferably 0 to 7 minutes, for example 5 minutes.

When the time is equal to 0, this means that that a rise in temperature up to the maximum temperature is carried out and that it returns to ambient temperature without a hold being maintained.

It will be noted that this hold time is in any case very short with respect to other sintering methods and that, similarly, the cycle time expressed as the overall, and the total duration of the process is reduced. This cycle time is, for example, from 10 to 30 minutes, in particular 20 minutes, which constitutes another advantage of the process according to the invention.

The cooling of the parts is generally carried out in a not too sudden manner, as a person skilled in this technical field may understand. Thus, a cooling rate of 80 to 600° C. per minute, for example 100 to 200° C./minute, will generally be observed starting from the temperature hold.

Preferably, the cooling is carried out via successive ramps that have different slopes, thus the cooling may be carried out, for example, as follows: 600° C./min$^{-1}$ during the first minute, then 100° C./min$^{-1}$ down to 600° C. and 40° C./min$^{-1}$ down to ambient temperature.

It is possible to bring the parts into contact, then to apply the pressure, and next, while maintaining the pressure, to apply the pulsed electric current to the parts in order to raise the temperature of the parts.

Advantageously, the parameters of temperature, and therefore of intensity, and of pressure (or of force applied, the pressure depending on the bearing surface according to the well-known equation P=F/S) are not, starting from ambient temperature and a pressure of 0 MPa, applied suddenly or instantaneously, but are gradually raised from ambient temperature and a pressure of 0 MPa.

For the temperature (governed by the intensity) preferably a gradual rise will thus be carried out with a ramp, or several ramps optionally having different slopes to arrive at the maximum temperature mentioned above, also called the hold or joining temperature.

The or said temperature ramp(s) preferably has (have) a slope of 50° C. to 200° C./min, for example 100° C./min.

For the pressure, it will be possible, in the same manner, to advantageously carry out a gradual rise with a ramp, or several ramps optionally having different slopes, to arrive at the maximum pressure indicated above, also called the hold or joining pressure.

The or said pressure ramp(s) preferably has (have) a slope of 1 MPa/min to 20 MPa/min, preferably 5 to 10 MPa/min.

The temperature rise and the pressure rise, whether they are (preferably) gradual or not, may advantageously be carried out simultaneously, concomitantly, over a same duration.

When several pressure ramps and several temperature ramps are carried out, the corresponding pressure and temperature ramps preferably have the same duration.

By applying the parameters of temperature (and therefore of intensity) and/or of pressure (and therefore of force applied) gradually and not suddenly, abruptly or instantaneously, subjecting the refractory ceramic parts to stresses that are too high is thus avoided and there is no breakage of the ceramic parts to be regretted.

Particularly surprisingly, it has been shown by the inventors that the results were better and the joining obtained of even better quality if the pressure (or force) necessary for producing the joining were applied only after a significant rise in temperature from ambient temperature, generally up to a temperature that enables the surfaces to be joined to be softened, to be softer, under the effect of this temperature.

This temperature at which a softening occurs is a temperature that is below the hold/joining temperature defined above but that must be high enough to enable said softening; generally this temperature is 50 to 300° C., preferably 100 to 250° C., more preferably 150 to 200° C., below the hold/joining temperature defined above.

The softening of the surfaces in contact under the effect of the temperature enables the surfaces to behave better during the joining operation.

For example, in the case where said hold temperature is 1750° C., the temperature of the parts is gradually raised to around 1600° C., preferably via two successive temperature ramps, and similarly the pressure (force) applied to the parts is gradually raised so that the pressure (or hold pressure) that enables the effective joining of the parts, namely a pressure of 75.6 MPa (for a force of 3.8 kN applied to the 8 mm diameter surfaces to be joined), is only applied when the temperature of the parts has reached 1600° C.

By way of example, a rise in temperature, from ambient temperature (generally 20 to 25° C.) up to 1750° C., could be carried out in the following manner:

ambient temperature to 600° C.: 3 minutes;
600 to 1600° C.: 10 minutes;
1600 to 1750° C.: 3 minutes;
hold at 1750° C. for 5 minutes.

During the same time, the pressure evolves in the following manner:

0 to 19.9 MPa: 13 minutes;
19.9 MPa to 75.6 MPa: 3 minutes;
hold at 75.6 MPa for 5 minutes.

The surface to be joined has a diameter of 8 mm (A=5.10$^{-5}$ m$^2$) and the pressures of 19.9 MPa and 75.6 MPa correspond respectively to applied forces of 1 kN and 3.8 kN.

The gradual rises in temperature and in pressure described above, in particular in the preferred embodiment of these rises in temperature, (where intermediate heating up to a softening temperature is carried out), mentioned above, make it possible to avoid, with certainty, the use of a supplementary heating step, as is the case in the prior art, in order to obtain the permanent joint, to thus obtain the joint directly, in a single step, and to improve even further the excellent quality of the joint of the two parts, with no surface visible at the interface.

It would moreover appear that the geometry of the current pulse "trains" also has an influence on the quality of the interface of the joint obtained.

The current is applied in the form of series or trains of pulses; each series or train is made up of a set and controllable number of pulses. The series (trains) are separated from one another by a time during which the current applied is zero.

In the process according to the invention, use is generally made of pulses of 1 to 5 ms, for example having a period of 3.3 ms, generally joined by trains of 1 to 15, for example 12 pulses, each train generally being separated by 1 to 15 periods, for example by 3 periods, of the above duration (such as 3.3 ms), with no current.

It is possible to change these values but the current must always keep the same geometry: namely trains of pulses greater or fewer in number, separated by variable periods with no current.

The tension applied is a few volts, generally 1 to 8 volts, preferably 2 to 7 volts, typically 5 volts.

The parts to be joined may be all be made of one and the same refractory ceramic or else the parts may be made of a different refractory ceramic.

The refractory ceramic(s) may be chosen from the carbide, nitride and oxide ceramics. Examples of these ceramics are SiC, TiN, ZrC and TiC.

The process according to the invention finds its application in all the fields where it is desired to produce ceramic/ceramic joints with a view to manufacturing complex shapes having a controlled microstructure via a rapid, universal and inexpensive process.

The process according to the invention allows the processing of materials in fields as diverse as the structural materials for Generation IV reactor cores, the assembly of future fuels, the assembly of fuel cells and obtaining materials with nanoscale microstructure, fields in which the joining of refractory ceramic parts had come up against a barrier, an insurmountable technological deadlock.

BRIEF DESCRIPTION OF THE DRAWINGS

Other features and advantages of the invention will appear more clearly when reading the description that follows, given by way of illustration and non-limitingly with reference to the appended figures in which.

DETAILED DESCRIPTION

Figure 1:
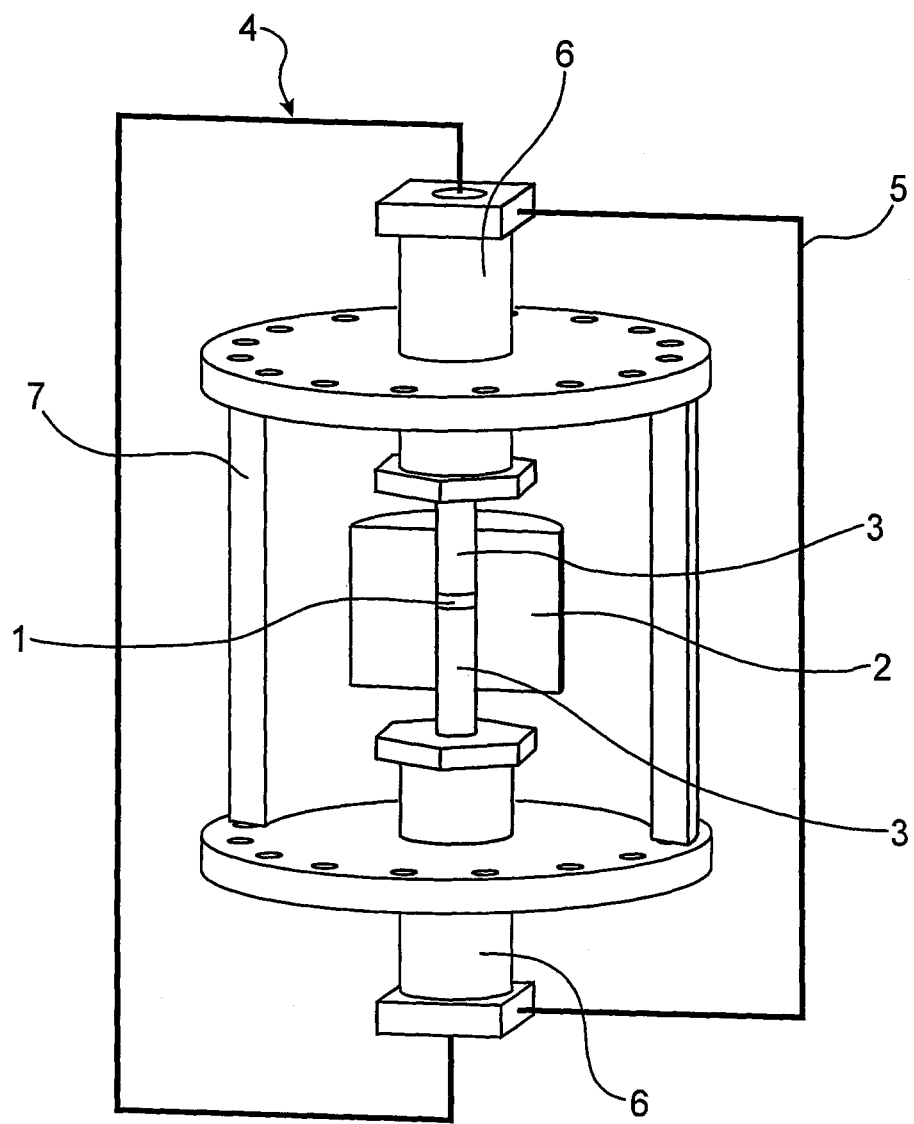
FIG. 1 is a schematic vertical cross-sectional view of an example of a known SPS device for implementing the process according to an aspect of the invention.

The process according to the invention is generally carried out in a conventional spark plasma sintering (SPS) machine or device such as, for example, that described in FIG. 1.

The process according to the invention generally consists firstly in placing the two or more parts to be joined in an SPS device, inside the graphite die of the latter.

The parts to be joined are generally two in number, but it is also possible to simultaneously join a larger number of parts possibly ranging, for example, up to 100.

The expression "refractory ceramic part" is generally understood to mean any element or entity of any shape, preferably of simple shape, incorporated, for example after joining to one or more other parts, into structures of larger dimensions, preferably of more complex shape. Owing to the process according to the invention, it is possible to obtain, after joining, parts even of very complex shape in a short time period and with all the advantages inherent to the process of the invention. The size of the joined parts obtained is only limited by the capacity of the SPS device which is well known to a person skilled in the art.

The two or more parts to be joined may be made of one and the same ceramic or else each of the parts to be joined may be made of a different ceramic.

Then the surfaces to be joined are brought into contact without any addition of any sort being placed between these surfaces.

The surfaces to be joined may be polished mirror type surfaces or else rough, as machined surfaces. Generally the surfaces to be joined are first degreased in an organic solvent, for example of the ketone, ester, ether or alcohol type, or a mixture thereof, etc., then dried, then a pressure of 1 to 150 MPa is generally applied to said parts. In other words, contact between the two opposing surfaces to be joined is established by pressure.

Generally, while maintaining the pressure, a pulsed electric current having an intensity of 500 to 8000 A is then applied to said parts so as to raise the temperature of the parts up to at least 1300° C.

In other words, when everything is in contact an electric current can be generated in order to create the temperature rise. Generally, the maximum amperage that a die can withstand is linked, in particular, to its diameter. Thus, for a sample diameter of 8 mm, it is possible to apply 2000 A without the risk of deteriorating the die. For diameters larger than 20 mm, it is possible to apply 4000 A or more. Once the joining has been carried out the electric current, and also the pressure, cease to be applied and the parts are cooled, generally down to ambient temperature, for example 20 to 25° C. The parts produced in the SPS device are recovered.

The invention will now be described with reference to the following examples, given by way of illustration and non-limitingly.

EXAMPLES

In these examples, parts made of SiC or of TiN, which were discs having a diameter of 8 mm and a thickness of 5 mm, were joined by SPS according to the process of the invention. For each material SiC or TiN, six joined samples were manufactured.

The SPS device used was an "SPS 2080" type device sold by SUMITOMO.

Example 1

In this example, two SiC parts (discs) were joined in the device mentioned above and under the following conditions:
temperature of 1800° C. for 5 minutes and under 50 MPa;
pulses train: 3.2 ms.
Characterization of the SiC samples obtained after joining
Optical observation
The samples obtained exhibit good cohesion. Visual observation does not reveal defects.
Destructive tests
Observation of the sample after cutting and polishing was carried out using a scanning electron microscope. FIGS. 2A to 2D present micrographs of the sample, obtained on surfaces polished after metallographic preparation.

Figure 2A:
FIGS. 2A to 2D are micrographs taken using a scanning electron microscope (SEM) of joints of SiC parts obtained by the process according to an aspect of the the invention after cutting and polishing.
Figure 2B:
Figure 2C:
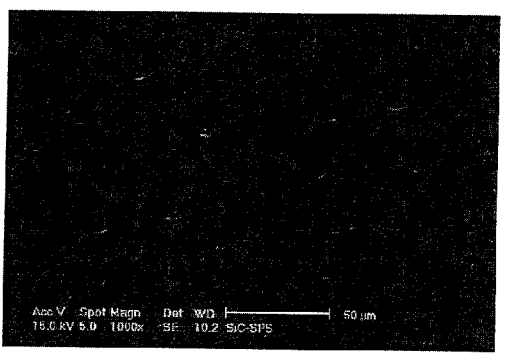
Figure 2D:
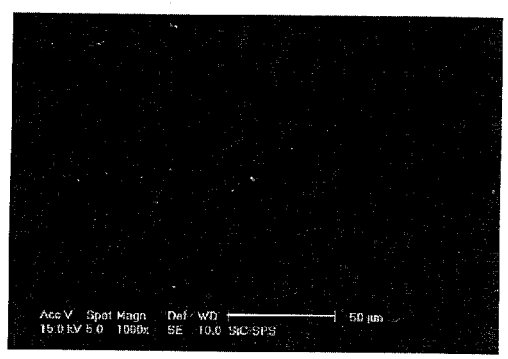
Figure 3A:
FIGS. 3A to 3D are micrographs taken using a scanning electron microscope (SEM) of the joints of SiC parts from FIGS. 2A to 2D, after thermal attack or heat treatment (HT) at 1550° C. for 5 hours under Argon 6.0.
Figure 3B:
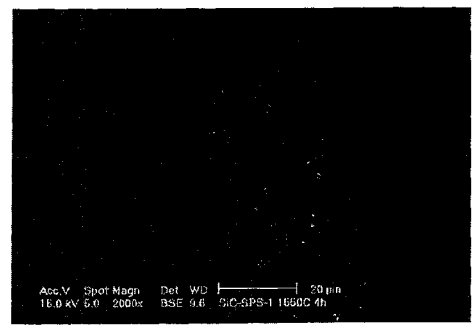
Figure 3C:
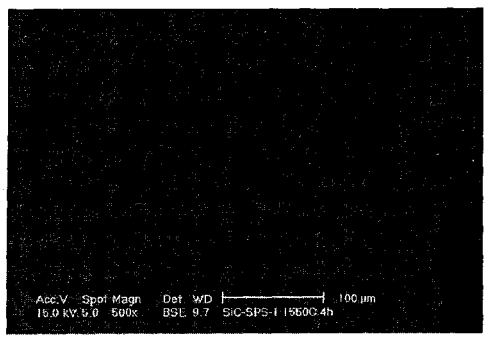
Figure 3D:
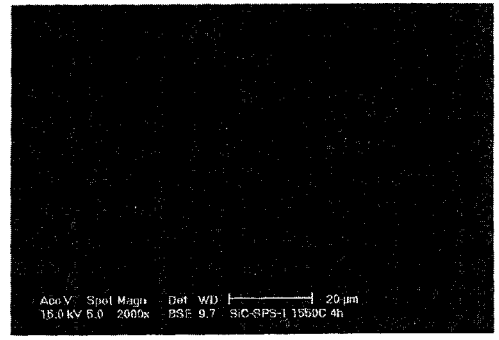

Observation of the edges of the sample has made it possible to define the initial interface that corresponds to the difference, gap, in the positioning of the two SiC pellets (FIG. 2A).

The surface of the SiC has a high, homogeneously distributed porosity (FIG. 2C), visualization of the interfacial zone is similar (FIG. 2D) and it was not possible to display the initial interface.

Observation of the microstructure after thermal attack (1550° C., 5 hours under Ar 6.0) is presented in FIG. 3. FIG. 3A is to be compared to FIG. 2A. Despite the thermal attack, the interface is barely visible. This is confirmed by FIGS. 3C and 3D: no modification in porosity or grain size is indicated at the interface.

Example 2

In this example, two TiN parts (discs) were joined in the device mentioned above and under the following conditions:
temperature of 1500° C. for 5 seconds and under 10 MPa;
pulses train: 3.2 ms.
Characterization of the TiN samples obtained after joining
Optical observation
The samples obtained exhibit good cohesion. Visual observation does not reveal defects.
Destructive tests
Observation of the sample after cutting and polishing was carried out using a scanning electron microscope.

Figure 4A:
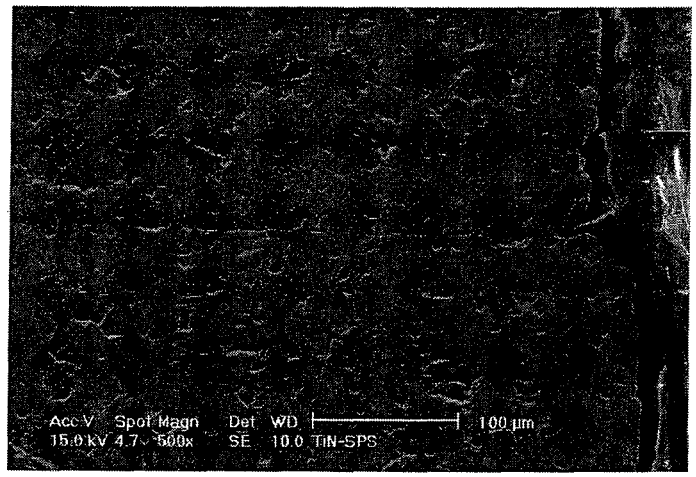
FIGS. 4A and 4B are micrographs taken using a scanning electron microscope (SEM) of joints of TiN parts obtained by the process according to an aspect of the the invention after cutting and polishing.
Figure 4B:
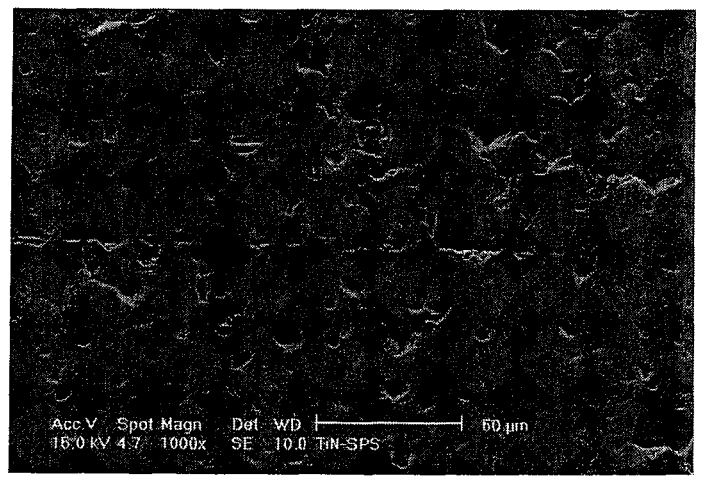

FIGS. 4A and 4B present micrographs of the sample, obtained on surfaces polished after metallographic preparation. The bond is visible and has a few defects: porosity or detachment of grains. It is however cohesive with grains that form the bond.

Conclusion

The SiC and TiN samples joined by SPS according to the process of the invention exhibit cohesive interfaces without modification of the microstructures.

The invention claimed is:

1. A process for joining, by spark plasma sintering, at least two refractory ceramic parts, the process comprising:
   bringing surfaces of the at least two ceramic parts into contact, the surfaces substantially free of bonding aids;
   applying joining pressure of 1 to 200 MPa to the at least two ceramic parts;
   joining the at least two ceramic parts by applying a pulsed electric current having an intensity of 500 A to 8000 A to the at least two ceramic parts so as to raise the temperature of the parts to a joining temperature of 1400° C. to 2000° C.,
   wherein the temperature of the at least two ceramic parts is gradually raised from an ambient temperature up to a softening temperature below the joining temperature of the at least two ceramic parts, the softening temperature enabling a softening of the surfaces to be joined, and then, only when the temperature of the at least two ceramic parts has reached the softening temperature, gradually raising the pressure applied to the at least two ceramic parts up to the joining pressure of the parts, and gradually raising the temperature of the at least two ceramic parts from the softening temperature up to the joining temperature of the at least two ceramic parts; and
   cooling the joined at least two ceramic parts.

2. The process according to claim 1, wherein applying joining pressure comprises applying a pressure of 10 MPa to 150 MPa.

3. The process according to claim 1, wherein applying a pulsed electric current comprises applying a current having an intensity of 500 A to 6000 A.

4. The process according to claim 1, further comprising maintaining the joining temperature for a duration of 0 minutes to 10 minutes.

5. The process according to claim 1, wherein the total duration of the process is from 10 minutes to 30 minutes.

6. The process according to claim 1, wherein cooling the ceramic parts comprises cooling at a rate of 80° C./minute to 600° C./minute.

7. The process according to claim 1, wherein applying a pulsed electric current comprises raising the temperature at a ramp rate, or several ramp rates having different slopes with respect to the softening temperature, to arrive at the joining temperature.

8. The process according to claim 7, wherein at least one of the ramp rate or the several ramp rates has a slope of 50° C./min to 200° C./min.

9. The process according to claim 1, wherein applying joining pressure comprises raising the pressure at a ramp rate, or at several ramp rates having different slopes, to arrive at the joining pressure.

10. The process according to claim 9, wherein at least one of the ramp rate or the several ramp rates has a slope of 1 MPa/min to 20 MPa/min.

11. The process according to claim 1, wherein raising the pressure and the temperature comprises several pressure ramps and several temperature ramps, the corresponding pressure and temperature ramps having the same duration.

12. The process according to claim 1, wherein the softening temperature is 50° C. to 300° C. below the joining temperature.

13. The process according to claim 1, wherein applying the pulsed electric current comprises applying current pulses having a period of 1 to 5 ms, joined by trains of 1 to 15, each train being separated by 1 to 15 periods.

14. The process according to claim 1, wherein the process comprises joining 2 to 100 ceramic parts.

15. The process according to claim 1, wherein each of the at least two ceramic parts comprise the same refractory ceramic material.

16. The process according to claim 1, wherein each of the at least two ceramic parts comprise a different ceramic material.

17. The process according to claim 1, wherein the at least two refractory ceramic parts comprise carbide, nitride or oxide ceramic materials.

18. The process according to claim 17, wherein the refractory parts comprise SiC, TiN, ZrC or TiC.

19. The process according to claim 2, wherein applying joining pressure comprises applying a pressure of 20 MPa to 100 MPa.

20. The process according to claim 19, wherein applying joining pressure comprises applying a pressure of 50 MPa to 75 MPa.

21. The process according to claim 3, wherein applying a pulsed electric current comprises applying a current having an intensity of 1000 A to 3000 A.

22. The process according to claim 1, wherein applying a pulsed electric current raises the temperature of the ceramic parts to a joining temperature of 1600° C. to 1950° C.

23. The process according to claim 4, further comprising maintaining the joining temperature for a time period of 1 to 7 minutes.

24. The process according to claim 23, wherein maintaining the joining temperature comprises maintaining the temperature for a time period of 5 minutes.

25. The process according to claim 5, wherein the total duration of the process is 20 minutes.

26. The process according to claim 8, wherein at least one of the ramp rate or the several ramp rates has a slope of 100° C./min.

27. The process according to claim 10, wherein at least one of the ramp rate or the several ramp rates has a slope of 5 to 10 MPa/min.

28. The process according to claim 12, wherein the softening temperature is 100° C. to 250° C. below the joining temperature.

29. The process according to claim 28, wherein the softening temperature is 150° C. to 200° C. below the joining temperature.

30. The process according to claim 13, wherein applying the pulsed electric current comprises applying current pulses for a period of 3.3 ms.

31. The process according to claim 13, wherein each train is separated by 3 periods.

32. The process according to claim 22, wherein applying the pulsed electric current raises the temperature of the ceramic parts to a joining temperature of 1750° C.

* * * * *